United States Patent [19]

Yamaguchi

[11] Patent Number: 5,316,734
[45] Date of Patent: May 31, 1994

[54] APPARATUS FOR CONVERTING SYNTHETIC RESIN INTO OIL

[75] Inventor: Takuo Yamaguchi, Naruto, Japan

[73] Assignee: USS Co., Ltd., Tokushima, Japan

[21] Appl. No.: 971,301

[22] Filed: Nov. 4, 1992

Related U.S. Application Data

[63] Continuation of Ser. No. 627,271, Dec. 14, 1990, abandoned.

[30] Foreign Application Priority Data

| Mar. 31, 1990 | [JP] | Japan | 2-86412 |
| Apr. 3, 1990 | [JP] | Japan | 2-89677 |
| Jun. 16, 1990 | [JP] | Japan | 2-158327 |
| Jun. 16, 1990 | [JP] | Japan | 2-158328 |

[51] Int. Cl.$^5$ ............ C08F 2/00; B01J 8/04; B01F 15/06; F22B 9/06
[52] U.S. Cl. ............ 422/135; 422/189; 422/224; 422/225; 122/164; 208/39; 366/144
[58] Field of Search .......... 422/184, 224, 225, 205, 422/135, 244, 110, 146; 122/164; 126/280, 240, 343.5 R, 343.5 A, 345, 347; 208/39, 44; 585/241; 366/144, 147

[56] References Cited

U.S. PATENT DOCUMENTS

| 264,410 | 9/1882 | Johnston | 126/345 |
| 354,314 | 12/1886 | Gebhardt | 126/345 |
| 406,911 | 7/1889 | Hubbard | 126/37 |
| 777,103 | 12/1904 | Kahn | 126/40 |
| 1,193,465 | 8/1916 | Marvin | 422/224 X |
| 1,456,102 | 9/1920 | Fogler | 422/224 |
| 1,614,791 | 11/1923 | Hamilton | 422/189 X |
| 1,663,640 | 3/1928 | Pais | 257/1 |
| 2,061,533 | 12/1934 | Anetsberger | 53/1 |
| 2,176,889 | 7/1936 | Childs | 126/391 |
| 2,180,774 | 8/1939 | Stanworth et al. | 126/345 X |
| 2,182,735 | 12/1939 | O'Dwod | 126/345 X |
| 2,643,183 | 6/1947 | Efferson | 422/135 X |
| 3,002,822 | 12/1952 | Leslie | 126/345 |
| 4,705,671 | 11/1987 | Ressel et al. | 422/189 |
| 4,848,318 | 7/1989 | Brewer | 126/390 |
| 5,027,743 | 7/1991 | Ludwig | 118/300 |

FOREIGN PATENT DOCUMENTS

| 279164 | 3/1913 | Fed. Rep. of Germany | 126/240 |
| 582118 | 3/1924 | France | 126/273.5 |
| 8370 | of 1840 | United Kingdom | 126/273.5 |
| 293699 | 8/1929 | United Kingdom | 126/273.5 |

*Primary Examiner*—Robert J. Warden
*Assistant Examiner*—Christopher Y. Kim
*Attorney, Agent, or Firm*—Wenderoth, Lind & Ponack

[57] ABSTRACT

An apparatus for converting synthetic resin into oil thermally decomposes the synthetic resin by heating it in a heating vessel, thereby producing oil. The apparatus includes the heating vessel and a heating furnace. The synthetic resin fed into the heating vessel is stirred. At least the lower part of the heating vessel is disposed in the heating furnace. By providing a radiating fin on the outer surface of the upper part of the heating vessel disposed outside the heating furnace or providing a heat-insulation on the outer surface of the upper part of the heating vessel disposed in the heating furnace, the temperature rise in the upper part of the heating vessel is limited.

15 Claims, 8 Drawing Sheets

APPARATUS FOR CONVERTING SYNTHETIC RESIN INTO OIL

This application is a 1.62 continuing application of now abandoned application, Ser. No. 07/627,271, filed Dec. 14, 1990.

BACKGROUND OF THE INVENTION

The present invention relates to an apparatus for converting mainly waste synthetic resin into oil by heating the synthetic resin in a heating vessel.

By heating thermoplastic synthetic rein to be liquified, then gasifying the liquid synthetic resin to gas, then cooling the gaseous synthetic resin, the thermoplastic synthetic resin can be converted into oil. To carry out this process, apparatus for converting synthetic resin into oil by heating the resin have been developed.

For example, in Japanese Patent Publication No. 17879/1986, an apparatus for converting synthetic resin into oil having a heating vessel on a screw conveyor is disclosed.

In the apparatus having a heating vessel, waste synthetic resin is successively fed into the vessel by the screw conveyor. The heating vessel is heated by a heater. The heating vessel is adapted to heat the waste synthetic resin fed thereinto, thereby melting and gasifying the resin. The gaseous synthetic resin is transferred into a condenser. In the condenser, the gasious synthetic resin is cooled and thereby converted into liquid oil.

In the apparatus having a screw conveyor, a heater is provided on the outer circumferential surface of the screw conveyor. The outer circumferential surface is heated by the heater. Waste synthetic resin is transferred by the heated screw conveyor and melted and gasified during the transfer. The gas is transferred through a gas pipe into a condenser. In the condenser, the gas is cooled and liquified to become oil.

Further, apparatus for converting waste synthetic resin into oil is disclosed in Published Unexamined Japanese Patent Application No. 22776/1976 and Japanese Patent Publication No. 1949/1977. This apparatus is provided with a melting tank in which the synthetic resin is melted and a reaction tank in which the synthetic resin is gasified. No. 48086/1985, an apparatus for converting synthetic resin into oil is disclosed in which a heating vessel used for heating and thermally decomposing the synthetic resin is uniformly heated. In this apparatus, the heating vessel is disposed in a heating furnace. The space between the heating furnace and the heating vessel is filled with a heat transmission medium so as to uniformly heat the heating vessel. As the heat transmission medium, sand, potassium, nitrate, sodium nitrate or the like is used. In this apparatus, the heating vessel is heated through the heat transmission medium and therefore it can be uniformly heated.

An apparatus for converting synthetic resin into oil using a heating furnace is advantageous in that the produced oil can be used as a fuel for melting and gasifying the synthetic resin. Accordingly, this apparatus is advantageous in that no extra fuel is consumed. The amount of the oil consumed in melting and gasifying the waste synthetic resin is about 10% to 20% of the oil produced from the waste synthetic resin.

However, the method of coverting synthetic resin comprising heating the heating vessel by a heating furnace is disadvantageous in that the amount of residuary substances not converted into oil and left in the heating vessel is large, and that the amount of gaseous components is large with a low yield of oil.

It is very important for such an apparatus to reduce the amount of residuary substances left in the heating vessel and to increase the yield of oil. It is laborious to take out a large amount of residuary substances and it is also laborious and expensive to dispose of them. Further, since the yield of oil is small, the waste synthetic resin cannot be effectively recycled.

In an apparatus for converting synthetic resin into oil in which the heating vessel is heated by a heating furnace, a large amount of residuary substances are left in the heating vessel and the yield of oil is low because it is difficult to control the temperature distribution in the heating vessel to the optimum condition.

In an apparatus in which the heating vessel is disposed in the heating furnace, when the heating vessel is heated by a burner, the synthetic resin in the vessel is melted and gasified in the following manner.

1. The synthetic resin fed into the heating vessel settles at the bottom of the vessel.
2. The heating vessel is heated from the bottom thereof by a burner.
3. The heated synthetic resin is melted at the bottom of the heating vessel. Therefore, molten synthetic resin settles at the bottom of the heating vessel.
4. The molten synthetic resin is further heated and gasified. The upper part of the heating vessel is full of gaseous synthetic resin.
5. The molten synthetic resin settles at the bottom of the heating vessel. Therefore, the temperature rise in the bottom part of the heating vessel is limited by the evaporation heat. Usually, the temperature of the molten synthetic resin is about 350° C. to 450° C.
6. The upper part of the heating vessel full of gas is heated to a high temperature. This is because the upper part cannot be maintained at a fixed temperature owing to the presence of molten synthetic resin.
7. The gas in the heating vessel is heated by the heating vessel heated to a high temperature.
8. The gas heated to a high temperature produces carbon and the carbon is deposited on the inner surface of the heating vessel. Further, the gas is thermally decomposed to produce a large amount of low distillate gas components.

Accordingly, an apparatus for converting synthetic resin into oil in which the heating vessel is heated by a heating furnace is disadvantageous in that a large amount of residuary substances is left in the vessel and the yield of oil is low. In an apparatus for converting synthetic resin into oil in which the space between the heating vessel and the heating furnace is filled with heat transmission medium, the heating vessel can be uniformly heated. However, since the heating vessel is heated through the heat transmission medium by the heat in the furnace, the thermal efficiency as a whole is low and a large amount of oil is consumed as fuel. Further, such an apparatus is disadvantageous in that although the heat transmission medium is required to be sufficiently circulated by convection so as to uniformly heat the vessel through the heat transmission medium, such convection of the heat transmission medium is hard to achieve.

SUMMARY OF THE INVENTION

An object of the present invention is to provide an apparatus for converting synthetic resin into oil in which the amount of residuary substances left in the heating vessel is small and the field of oil is high.

An apparatus for converting synthetic resin into oil according to the present invention can overcome the above-mentioned disadvantages of the conventional apparatus, and provide ideal temperature distribution in the heating vessel. The apparatus according to the present invention can reduce the amount of residuary substances left in the heating vessel. In the apparatus according to the present invention, the content of the heating vessel is stirred and the upper part of the heating vessel is disposed outside the heating furnace with a radiating fin provided on the outer circumferential surface of this upper part. Further, in an apparatus according to the present invention having another construction, a heat-insulator is provided on the outer circumferential surface of the upper or middle part of the heating vessel, thereby heat-insulating that part of the vessel. In the apparatus having such a construction, the temperature of the upper part of the heating vessel can be maintained low and the amount of residual substances deposited on the inner surface of the heating vessel can be reduced.

DETAILED DESCRIPTION OF THE INVENTION

Embodiments of an apparatus according to the present invention will now be described below with reference to the drawings.

Figure 1:
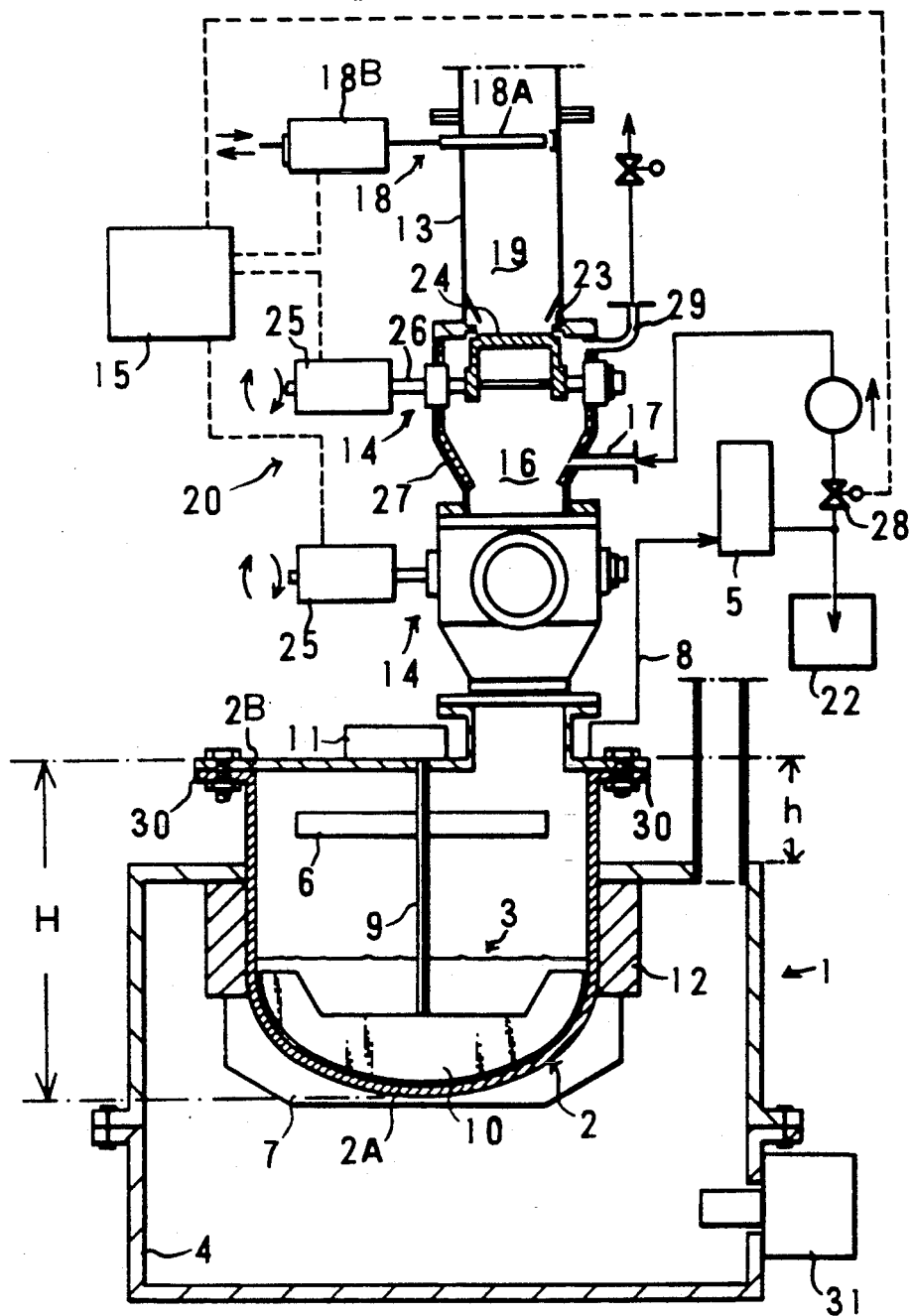
FIGS. 1–5 are partly sectional side views of embodiments of an apparatus for converting synthetic resin into oil according to the present invention.

An apparatus for converting synthetic resins into oil shown in FIG. 1 comprises a heat reaction means 1, a feeding means 20 and a condenser 5.

Waste synthetic resin is heated in a closed space by the heat reaction means 1. The heat reactions means 1 is provided with a closed heating vessel 2, a stirring means 3 for stirring the synthetic resin fed into the vessel 2, and a heating furnace 4 for heating the vessel 2.

The heating vessel 2 comprises a vessel body 2A and a lid plate 2B. The heating vessel 2 has an opening at the top end thereof. This opening is closed with the lid plate 2B. The vessel body 2A is circular-shaped in the horizontal section. The upper part of the vessel body 2A is circular cylindrical and the bottom part thereof is spherically curved. Since the vessel body 2A has such a shape, it is possible to bring the stirring means 3 for stirring the synthetic resin close to the inner surface of the vessel body 2A and it is also possible to prevent the synthetic resin from being deposited on the inner surface of the vessel body 2A.

A heat absorptive fin 7 is fixed onto the outer surface of the bottom part of the vessel body 2A so that the vessel body 2A can efficiently absorb heat from combustion gas of a burner. A radiating fin 30 for promoting cooling is fixed to the upper part of the vessel body 2A. The radiating fin 30 is fixed to outer circumferential surface of the vessel body 2A so as to be outwardly projected in the shape of a flange. The radiating fin 30 functions also as a flange used for connecting the lid plage 2B with the vessel body 2A. Thus, the lid plate 2B is connected to the vessel body 2A through set screws extending through the radiating fin 30 fixed to the vessel body 2A.

The upper portion of the heating vessel 2 projects outside the heating furnace 4. When the upper portion of the heating vessel 2 projects outside the heating furnace 4 in such a manner, the height (h) of the projecting portion is selected to be 10% to 15%, and more preferably 15% to 40% of the whole weight (H) of the heating vessel 2.

A gas pipe 8 is connected through the lid plate 2B to the heating vessel 2. The other end of the gas pipe 8 is connected to the condenser 5.

The stirring means 3 comprises a rotation shaft 9, blades 10 and a driving motor 11. The rotation shaft 9 extends vertically and airtightly through the center of the lid plate 2B of the heating vessel 2 and is rotatably carried by the lid plate 2B. The blades 10 are fixed to the lower end of the rotation shaft 9. The blades 10 are fixed radially to the rotation shaft 9. The outer periphery of the blade 10 is so shaped as to be close to the inner surface of the heating vessel 2. The space between the outer periphery of the blades 10 and the inner surface of the heating vessel 2 is controlled to be in the range of 1 mm to 100 mm, and preferably 3 mm to 50 mm.

The blades 10 having such a shape can scrape off the synthetic resin deposited on the inner surface of the heating vessel and therefore can advantageously remove residuary substances deposited on the inner surface of the heating vessel 2.

Further, a gas stirring blade 6 is fixed to an upper portion of the rotation shaft 9, is positioned above the level of the molten synthetic resin, and is adapted to stir the atomized or gasified synthetic resin within the vessel body 2A. Thus, the heat reaction means 1 provided with the gas stirring blade 6 advantageously can obtain uniform temperature of the atomized or gasified synthetic resin, thereby decreasing the production of carbon and increasing the yield of oil.

The heating vessel 2 shown in FIG. 1 is heat-insulated by a heat-insulator 12 at a portion below the projecting part of the heating vessel 2 outside the heating furnace 4, that is, at the upper portion of the heating vessel part inside the heating furnace 4. The heat-insulator 12 is provided for obtaining uniform temperature distribution within the heating vessel 2. The heat-insulator 12 controls the transmission of the heat energy from the burning flames in the heating furnace 4 to the heating vessel 2.

In the heating vessel 2 having such a construction, the bottom part is heated with flames, and the heat energy transmission is controlled in the middle part, and further, heat radiation is performed in the upper part so that the internal temperature of the heating vessel 2 is made uniform.

Less heat energy is supplied to the inner wall of the part of the heating vessel 2 provided with the heat insulator 12 than is supplied to the bottom part. Therefore, less carbon is deposited in the inner surface of this insulated part.

As shown in FIG. 1, by positioning the blade 10 of the stirring means 3 above the lower edge of the heat-insulator 12, the residuary substances deposited in the inner surface of the heating vessel 2 can be reduced.

In the usual use conditions, the level of the synthetic resin in the heating vessel 2 changes. This is because the feeding of the synthetic resin to the heating vessel 2 is controlled according to the internal temperature of the heating vessel. When the temperature of the molten synthetic resin in the heating vessel 2 rises higher than a fixed value, the synthetic resin is fed to the heating vessel, thereby lowering the temperature of the molten synthetic resin in the heating vessel 2. When the synthetic resin is fed, the level of the molten synthetic resin rises. Further, as the synthetic resin fed to the heating vessel 2 is melted, gasified and transferred to the condenser 5, the level of the synthetic resin in the heating vessel 2 falls.

The level of the synthetic resin in the heating vessel 2 also changes with the output of a burner used for heating the heating furnace 4 and with the fixed temperature of the synthetic resin. With a large output of the burner and a low fixed temperature, the level of the synthetic resin rises. On the contrary, with a small output of the burner and a high fixed temperature, the level of the synthetic resin falls.

As shown in FIG. 1, the optimum level of the synthetic resin in the heating vessel 2 is near the lower edge of the heat-insulator 12. The amount of synthetic resin fed, the output of the burner and the temperature of the molten synthetic resin are so controlled as to set the level of the synthetic resin near the optimum level.

The rotation shaft 9 is connected to the driving motor 11 and is rotated by the driving motor 11.

Zeolite or metal catalysts and the like are used in the heating vessel 2 so that the waste synthetic resin can be heated and efficiently converted to oil. As metal catalysts, nickel or stainless steel are used. It is possible to form the rotation shaft 9 and the blade 10 of nickel or stainless steel as a metal catalyst.

Figure 2:
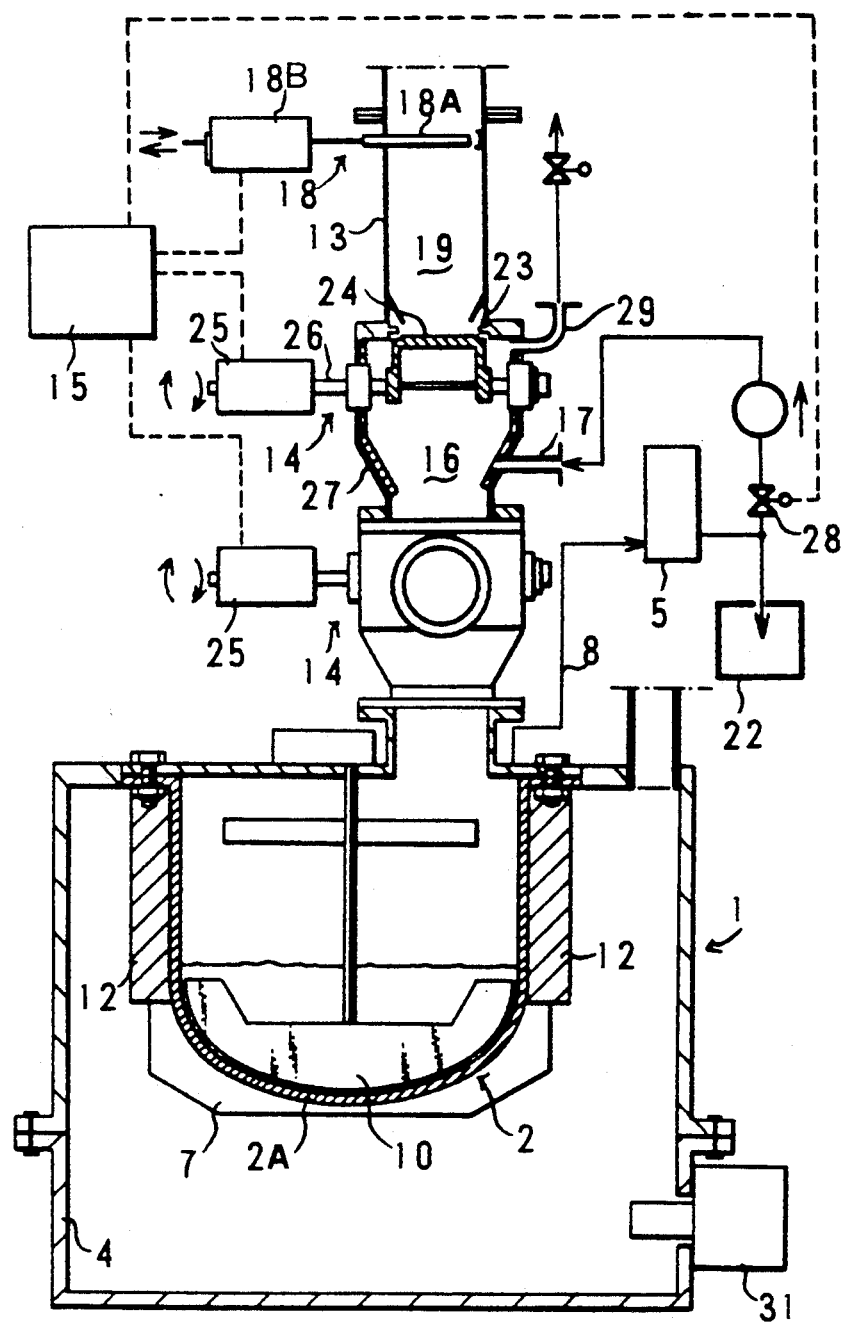

In a heating reaction means 1 shown in FIG. 2, the heat-insulated part of the heating vessel 2 does not project outside the heating furnace 4. In other words, the heating vessel 2 is disposed entirely in the upper portion of the heating furnace 4, and the upper part of the heating vessel 2 is heat-insulated with the heat-insulator 12.

Figure 3:
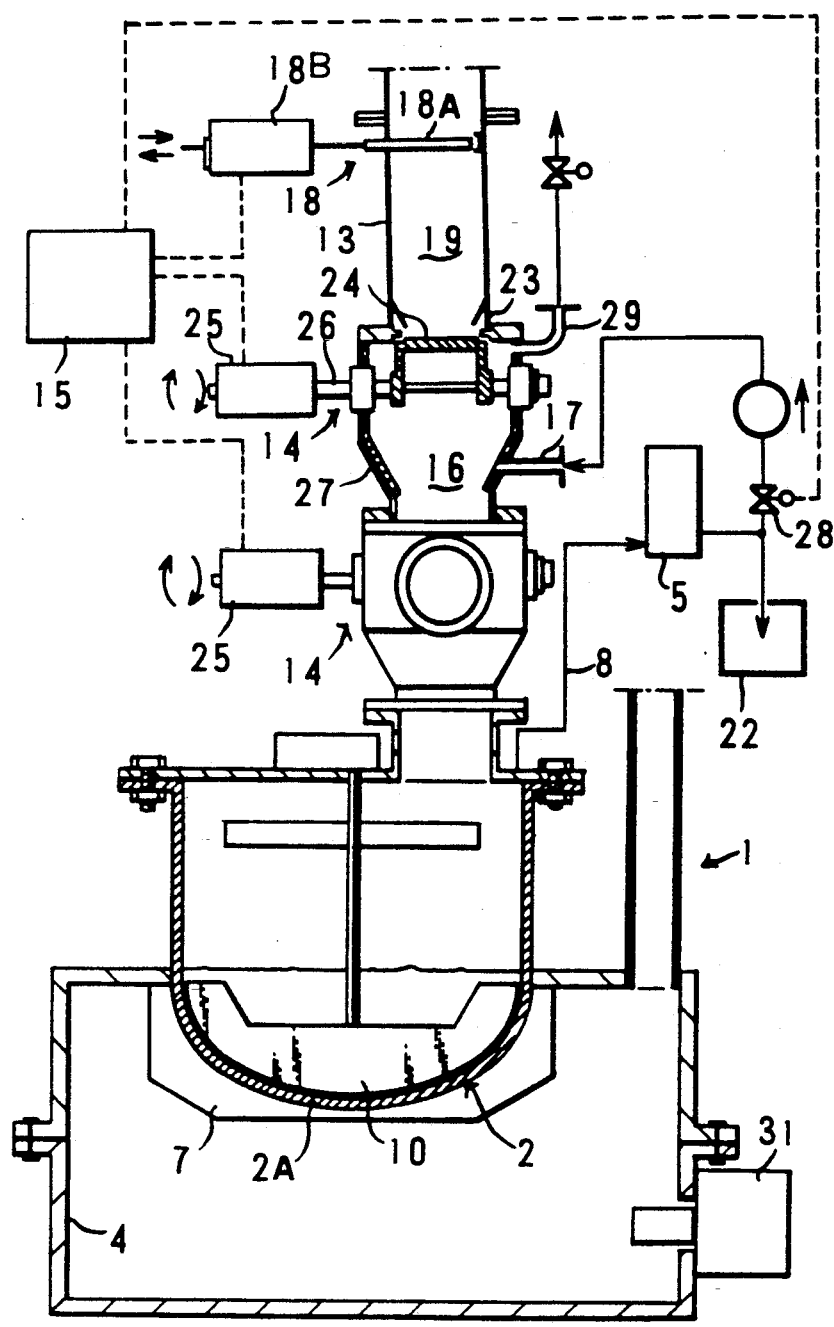

Further, in a heat reaction means 1 shown in FIG. 3, the part of the heating vessel 2 above the middle portion of the vessel projects outside the heating furnace 4 and no heat-insulator is provided on the outer surface of the vessel 2. In a heat reaction means 1 having such a construction, the height (h) of the part projecting outside the heating vessel 2 is selected to be 30% to 70% of the whole height (H) of the vessel 2.

Figure 4:
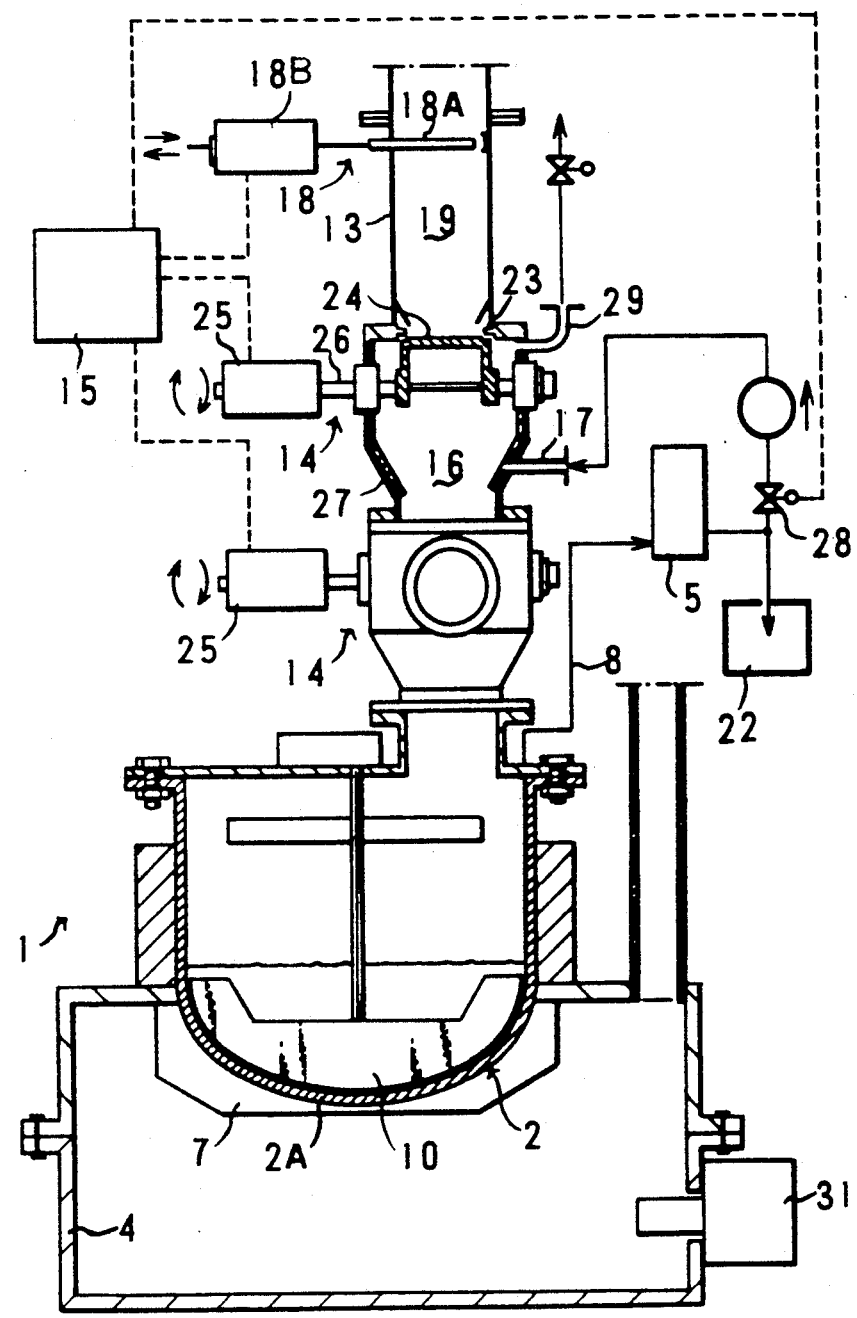

Further, in a heat reaction means 1 shown in FIG. 4, the lower portion of the part of the heating vessel 2 projecting outside the heating furnace 4 is heat-insulated. In a heat reaction means 1 having such a construction, the height (h) of the part projecting outside the heating furnace 4 is selected to be 30% to 80% of the whole of the height (H) of the heating vessel 2.

The gaseous composition heated in the heating vessel 2 is cooled and liquified by the condenser 5 to produce oil. The condenser 5 is connected to an oil tank 22 in which the oil is stored.

Waste synthetic resin is fed by the feeding means 20 into the heating vessel 2. Any mechanism capable of feeding synthetic resin in an insulated state from outside can be used as such a feeding means 20.

The heating furnace 4 has a construction which is divided into upper and lower parts. Such a heating furnace 4 is advantageous in that by removing the lower part of the heating furnace 4, the vessel body 2A can be easily maintained and inspected. The heating furnace 4 is provided with a burner 31, which burns the oil obtained by the conversion of the waste synthetic resin, and therefore, extra fuel is not required.

The feeding means 20 shown in FIG. 1 comprises a feed pipe 13 for feeding waste synthetic resin into the heating vessel 2, a plurality of valves 14 provided in the feed pipe 13 and adapted to feed the waste synthetic resin while blocking off air, and a control means 15 for controlling the opening and closing of the valves 14.

The feed pipe 13 is connected vertically to the lid plate 2B of the heating vessel 2 so as to cause the waste synthetic resin to fall and be fed to the heat reaction means 1.

The feed pipe 13 shown in FIG. 1 is provided with a gate valve 18 at the top. Below the gate valve 18, two valves 14 are provided in series. The feed pipe 13 has a feed chamber 19 between the gate valve 18 and the upper valve 14, and a temporary storage chamber 16 between the upper and lower valves 14.

The gate valve comprises an opening and closing plate 18A movable in the lateral direction with respect to feed pipe 13, and a direct-acting cylinder 18B for moving the opening and closing plate 18A. The opening and closing plate 18A is movable across the feed pipe 13 in the lateral direction.

In FIG. 1, the opening and closing plate 18A, when moved to the right, closes the feed pipe 13, and when moved to the left, opens the valve 18.

The valve 14 comprises a valve seat 23, a rotary valve 24, and a reduction motor 25 for rotating the rotary valve 24. The rotary valve 24 is fixed to a rotation shaft 26 which extends airtightly into the feed pipe 13 and is mounted on a bearing on the feed pipe 13. When the rotary valve 24 is rotated upwardly as shown in FIG. 1, the rotary valve 24 closely contacts the valve seat 23, so that the valve 14 is closed. When the rotary valve 24 is rotated through an angle of 90° from the position shown in FIG. 1, the valve 14 is opened. The valve seat 23 has a shape capable of closely contacting the rotary valve 24 when the rotary valve 24 is rotated upwardly.

Two valves 14 provided above and below the temporary storage chamber 16 have the same shape. The capacity of the temporary storage chamber is selected to be substantially equal to or a little larger than that of the feed chamber 19. This is because all the waste synthetic resin stored in the feed chamber 19 is fed to the temporary storage chamber 16.

Metal catalysts 27 are fixed to the inner surface of the part of the feed pipe 13 defining the temporary storage chamber 16. The catalysts serve to aid in efficiently converting the waste synthetic resin heated in the temporary storage chamber 16 into oil.

Further, heated oil is fed into the temporary storage chamber 16 in order to preliminarily heat the waste synthetic resin stored in this chamber and to surely close the valve 14. The heated oil is fed through a heated oil feed pipe 17. For this purpose, a heated oil feed pipe 17 is connected to the temporary storage chamber 16.

The heated oil feed pipe 17 is used to feed the oil which has been converted from the synthetic resin in the heated state into the temporary storage chamber 16. The other end of the heated oil feed pipe 17 is connected to the outlet opening of the condenser 5 so that the heated oil can be fed from the condenser 5.

By opening a feed valve 28, the heated oil can be fed through the heated oil feed pipe 17 into the temporary storage chamber 16. When a part of the oil converted from the waste synthetic resin is fed into the temporary storage chamber 16 as mentioned above, it is unnecessary to heat oil from outside the apparatus. However, extra oil different from the oil converted from the waste synthetic resin may be fed through the heated oil feed pipe 17 into the temporary storage chamber 16. As such an oil, heavy oil, gas oil, kerosene or the like can be used.

Further, when using this apparatus for the first time, no oil converted from the waste synthetic resin can be obtained from the heat reaction means 1, and therefore oil from outside the apparatus must be heated and fed into the temporary storage chamber 16.

An outlet pipe 29 is connected to the upper portion of the temporary storage chamber 16 and is used for exhausting gas out of the temporary storage chamber 16. When the heated oil is fed into the temporary storage chamber 16 with the valve 14 in the closed state, the amount of gas corresponding to that of the heated oil and to that of the amount of gas generated from the waste synthetic resin by the addition of heated oil is exhausted out of the temporary storage chamber 16. When high temperature oil is fed into the temporary storage chamber 16, a part of the waste synthetic resin in the chamber 16 is gasified. The obtained gas serves to more effectively discharge the residual air out of the temporary storage chamber 16.

The temperature of the oil fed through the heated oil feed pipe 17 into the temporary storage chamber 16 is controlled preferably within the range of 150° C. to 200° C.

The control member 15 controls the opening and closing of the valve 14, a feed valve 28 and the gate valve 18. The feed valve 28 is adapted to be opened for feeding the heated oil into the temporary storage chamber 16 with the upper and lower valves 14 in the closed state, that is, with the temporary storage chamber 16 in the airtightly closed state.

The waste synthetic resin in the feed pipe is fed into the heat reaction means 1 with only the lower valve 14 in the opened state so that the heat reaction means 1 is prevented from being communicated through the feed pipe 13 to the atmosphere. When the upper valve 14 is opened, the waste synthetic resin is fed from the feed chamber 19 into the temporary storage chamber 16. When the lower valve 14 is opened, the waste synthetic resin is fed from the temporary chamber 16 into the heat reaction means 1.

The operation of the apparatus for converting synthetic resin into oil as shown in FIGS. 1-4 is as follows.

1. Synthetic resin is fed into the heating vessel 2. When the synthetic resin is fed into the heating vessel 2 for the first time, preferably oil preliminarily converted from the synthetic resin is fed into the heating vessel 2. Accordingly, a part of the synthetic resin is immersed in the oil.

When the synthetic resin is fed into the heating vessel 2 in such a manner, the synthetic resin immersed in the oil can be efficiently heated and melted.

2. The heating furnace 4 heats the bottom part of the heating vessel 2, so that the synthetic resin in the vessel 2 is heated.

3. The heated synthetic resin is melted at the bottom of the heating vessel 2. A part of the molten synthetic resin is gasified, and the obtained gas is transferred through the gas pipe 8 to the condenser 5.

4. In the condenser 5, the gas is liquified and converted into oil.

5. After the gas from the molten synthetic resin is discharged out of the heating vessel 2, additional synthetic resin is fed into the vessel and melted and gasified.

In the apparatus for converting synthetic resin into oil in such a manner, the synthetic resin is converted into oil with a special temperature distribution in the heat vessel 2. As shown in FIGS. 1, 3 and 4, the upper part of the heating vessel 2 projects out of the heating furnace 4 and is provided with the radiating fin 30 for cooling, or as shown in FIG. 4, the outercircumferential surface of the middle part of the heating vessel 2 is heat-insulated. In FIG. 2, the vessel is within the furnace, and the upper part is heat-insulated.

Projecting out of the heating furnace 4 and provided with a radiating fin for cooling, or heat-insulated from the heating furnace 4, the upper part of the heating vessel 2 is not heated directly by the flames of the heating furnace 4. Therefore, the apparatus for converting synthetic resin into oil can be so designed that the temperature rise in the upper part of the heating vessel 2 is kept low.

In a conventional apparatus for converting synthetic resin to oil in which the whole heating vessel is disposed within the heating furnace and is not insulated, or the upper part of the reaction furnace is not cooled, the temperature in the upper part of the heating vessel 2 rises to a high level. Consequently, the synthetic resin gas formed by gasification in the heating vessel is further heated to a higher temperature to produce carbon, or further decomposed into low distillates, thereby decreasing the amount of oil components. The carbon is deposited on the inner surface of the heating vessel as residuary substance, or the gas constituting the low distillates is discharged without being converted into oil by the condenser.

On the contrary, in an apparatus having the above-described construction according to the present invention, the temperature rise in the upper part of the heating vessel is limited due to the special construction, and more uniform temperature distribution through the inside of the vessel can be obtained. Accordingly, in this apparatus, the gas stored in the upper part of the heating vessel can be prevented from being overheated to produce carbon or from being further decomposed into low distillates.

Therefore, in such an apparatus according to the present invention, the formation of the residuary substances deposited on the inner surface of the upper part of the heating vessel can be reduced. Further, the gas of the low distillates formed by the further decomposition can also be reduced. As a result, the apparatus is advantageous in that the residuary substances can be easily removed and that the synthetic resin can be efficiently converted into a high yield of oil.

Further, in an apparatus according to the present invention, the vessel body 2A and the lid plate 2B are connected together through the connecting portions disposed outside the heating furnace 4, and therefore has the advantage of being easily maintained and inspected.

Furthermore, since the radiating fin 30 is also used as a flange for connecting the lid plate 2B to the vessel body 2A, the apparatus is advantageous in that additional members are not required for fixing the lid plate 2B to the vessel body 2A, thereby simplifying the construction of the connecting portion.

Figure 5:
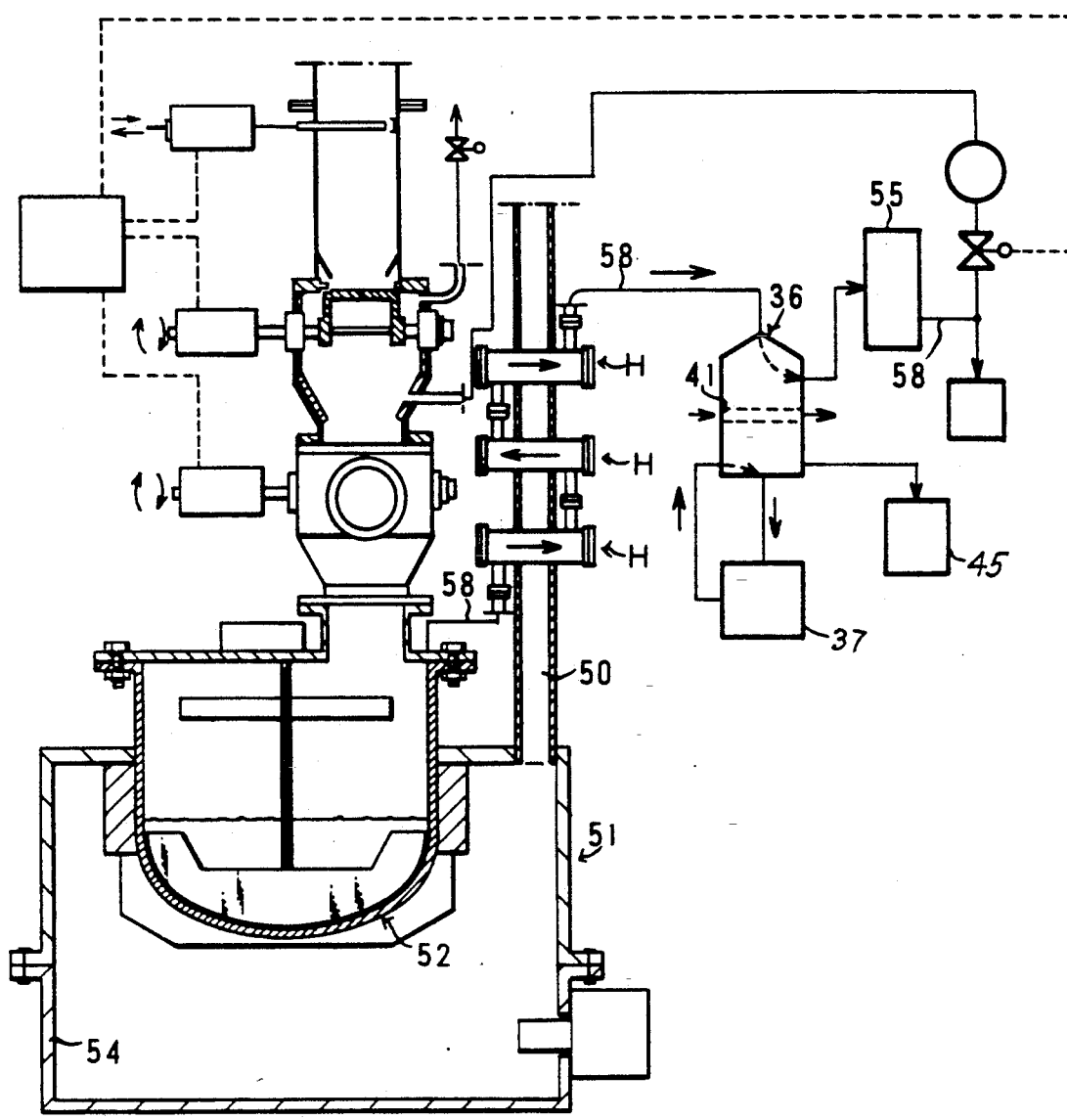

A further embodiment of the present invention is shown in FIG. 5 in which the heating vessel 52 is connected through reactors H to the condenser 55. The reactors H are adapted to contact the gaseous synthetic resin gasified in the heating vessel 52 with catalysts to decompose the same into low molecular substances. The synthetic resin supply means, furnace, heating vessel, etc. can be the same as any of the earlier described embodiments, although the heating vessel like that of FIG. 1 is shown.

Figure 6:
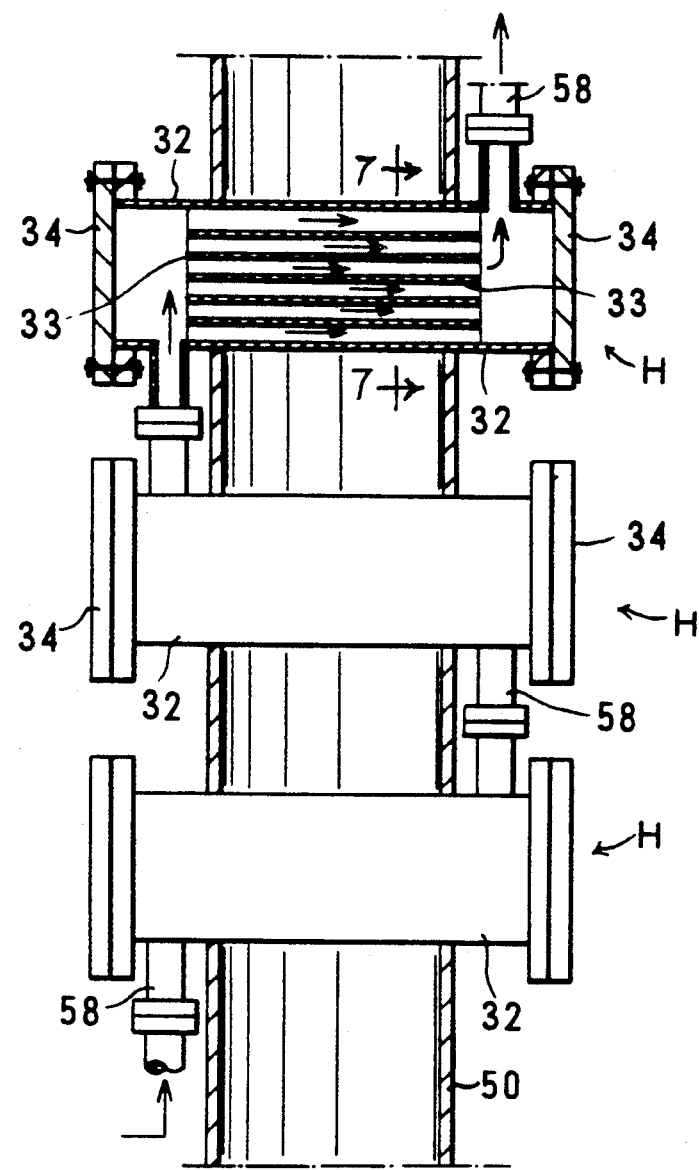
FIG. 6 is a sectional view of reactors connected in series.
Figure 7:
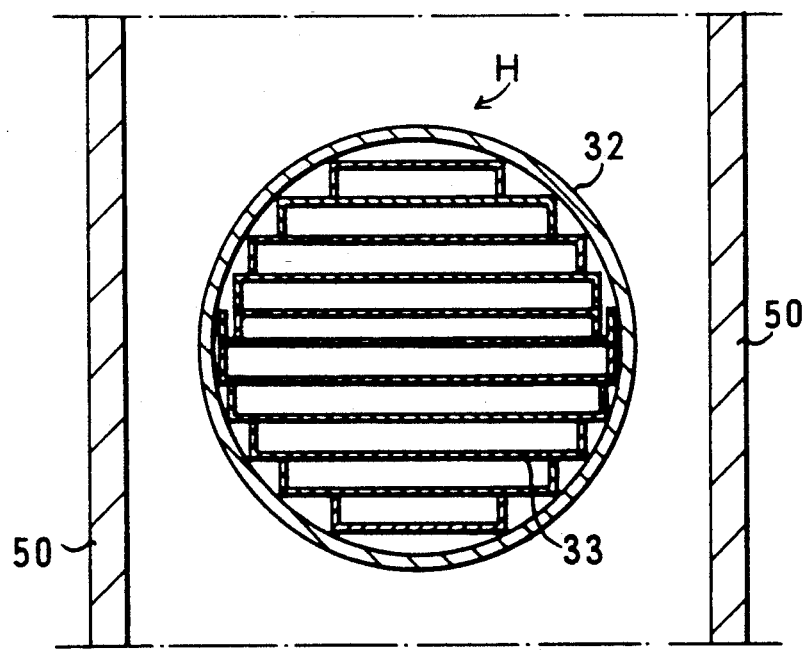
FIG. 7 is a sectional view taken on line 7—7 in FIG. 6.

The construction of the reactors H is shown in FIGS. 6 and 7. Each reactor H comprises a cylindrical casing 32 and plate-shaped catalysts 33 contained in the casing 32.

The casing 32 is airtightly closed so as to prevent the gas transferred through the gas pipe 58 into the casing from leaking to the outside. The casing 32 is heated with the waste heat from the heating furnace 54 and is therefore fixed within a flue 50 of the heating furnace 54. Both ends of the casing 32 project outwardly from the flue 50. The projecting ends of the casing 32 are provided with flanges. A lid 34 is airtightly fixed to the flange with set screws. By disengaging the set screws and removing the lid 34, the casing 32 can be opened. The casing 32 is provided with gas inlet and outlet openings at the opposite ends. The gas inlet opening is positioned at the bottom of the casing 32, and the gas outlet opening in the upper portion.

In the apparatus shown in FIGS. 6 and 7, three reactors H are connected in series and are vertically arranged in the flue 50. The gas generated in the heating vessel 52 is transferred from the lower reactor H through the middle reactor H to the upper reactor H. Therefore, the lower reactor H is connected to the heating vessel 52 and the upper reactor H is connected to the condenser 55. The middle reactor H is connected to the upper and lower reactors H.

Each reactor H is provided with the gas inlet opening at the bottom and the gas outlet opening in the upper portion and these reactors are connected together in series.

By connection of the reactors H. the gas transferred from the heating vessel 52 can be effectively subjected to dry distillation and smoothly discharged, and the components liquified in the reactor H are reheated, thereby preventing the gas pipe 58 from being clogged. This is because the gas flows through the reactors H in the following manner.

1. The gas introduced into each of the reactors H comes in contact with the catalyst 33 to be decomposed into low molecular gas.

2. Since both ends of the reactor H project outwardly of the flue 50 and the middle portion thereof is in the flue 5, the gas in the reactor H flows convectionally and is stirred. This is because the gas is cooled in both end portions of the reactor H and is heated in the middle portion.

3. The stirred gas effectively comes into contact with the catalysts 33 and is decomposed into low molecular gas. However, a part of the gas is liquefied.

4. The low molecular gas obtained by the decomposition is transferred through the gas outlet opening of the uppermost reactor H to the next step.

5. The liquefied components in the reactor H are heated again in the middle portion of the casing 32, converted into gas, and transferred through the gas outlet opening of the upper reactor H.

6. The liquid components which are not converted into gas flow backward into the lower reactor H.

7. Among the internal temperatures of the reactors connected in series, that of the lower reactor is higher. In this connection, in the apparatus manufactured by the inventor for a test, the internal temperature of the lowermost reactor H was above 360° C., while that of the middle reactor H was 330° C., and that of the uppermost reactor H was 290° C.

Accordingly, the substance liquefied in the upper reactor H flows backward into the lower reactor H. and is reheated to a higher temperature and reconverted into gas.

The gas obtained by the reconversion is, after being in contact with the catalysts 33, transferred to the upper reactor H and further transferred as gas to the condenser 55.

Consequently, the reactors H having such a construction can most effectively subject the gas fed from the heating vessel 52 into the reactors to dry-distillation and transfer the same to the condenser 55.

Plate-shaped catalysts 33 are contained in the reactors H, and are layered with a space, for example about several millimeters or centimeters, therebetween so that the gas can pass through these spaces. The catalysts 33 are so bent at both sides as to form channel shapes so that they can be easily layered. The catalysts 33 having such shapes are advantageous in that they have a large contact area with the gas, thereby efficiently subjecting the gas to dry distillation.

The shape of the catalyst 33 according to the present invention is not limited to that shown in the drawings. Although not shown, the catalyst may be cylindrical or rod-shaped. Further, the catalyst 33 may be fibers or particles of metal ad the catalyst fibers and particles may be contained in the casing with spaces therebetween.

In the apparatus having the above-described construction, the gas is condensed, after it is decomposed into low molecular gas, in the reactors H, so that a large amount of light oil can be obtained with a small amount of heavy component, and the obtained oil can be effectively used as a high quality oil.

A cooling and heating heat exchanger can be connected between the reactors and the condenser which is adapted to remove the heavy component contained in the gas transferred from the reactors.

Figure 8:
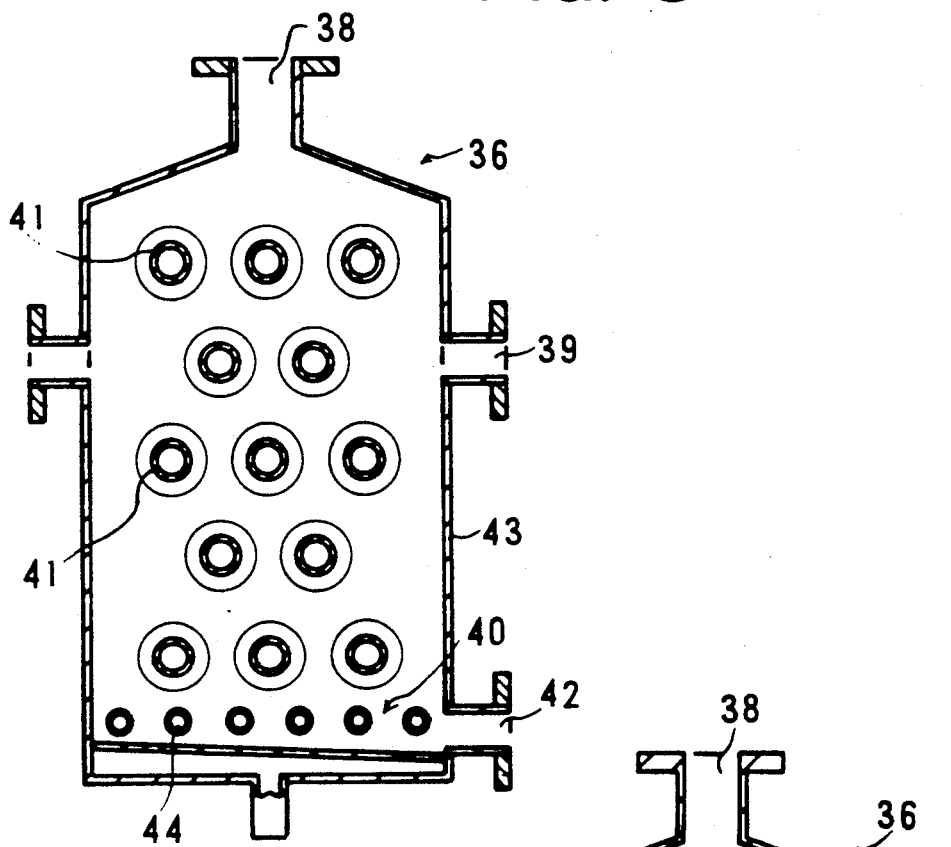
FIGS. 8 and 9 are sectional views of a cooling and heating exchanger.
Figure 9:
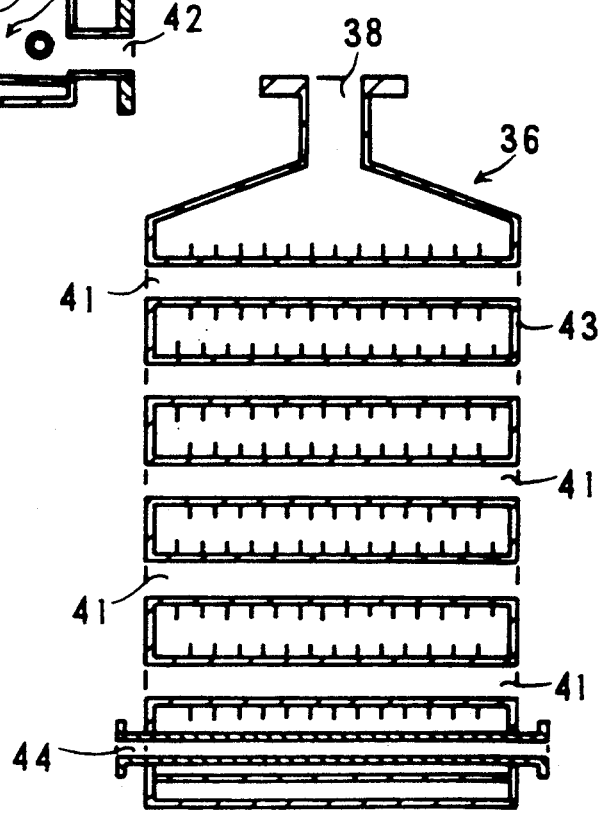

Such a cooling and heating heat exchanger 36 is shown in FIGS. 8 and 9. The heat exchanger 36 has a casing 43 into which the gas flows from the heat reaction means 51. The casing 43 is provided with a gas inlet opening 38 for introducing gas from the heat reaction means 51 at the top and with a gas outlet opening 39 for exhausting the cooled gas at a position a little lower than the top.

The gas inlet opening 38 is connected through the reactors to the heat reaction means 51, while the gas outlet opening 39 is connected to the condenser 55.

Further, at the bottom of the casing 43 is a hot water channel means 40 which comprises a double bottom and hot water pipes 44 arranged in parallel with one another above the double bottom. The upper surface of the hot water channel 40 provided at the bottom is inclined downwardly toward a wax discharge opening 42. The cooling and heating heat exchanger 36 is advantageous in that the heavy components deposited at the bottom are heated so as to have a low viscosity and therefore they can be smoothly discharged through the wax discharge opening 42.

Further, since the hot water pipes are provided somewhat apart from the bottom, the part of the heat exchanger near the bottom can be heated and the heavy components can be more effectively heated.

The hot water channel means 40 is connected to a water heating means 37. Hot water is fed from the water heating means 37 to the hot water channel means 40. The temperature of the hot water is usually controlled so as to be within the range of 50° C. to 98° C., preferably 65° C. to 95° C. and more preferably 75° C. to 90° C. so as to heat the heavy components to give them a low viscosity.

Gas fed into the casing 43 is cooled by outside air. For this purpose, air pipes 41 are airtightly connected between opposite walls of the casing 41.

In the air pipes 41, outside air flows freely. For this purpose, both ends of the air pipes 41 are open. The outer surfaces of the air pipes 41 define gas passages in the casing 43.

As shown in FIG. 9, since both ends of the air pipes 41 are open, the gas in the casing 43 can be forcibly cooled with only the simplest construction.

A specific construction for cooling by means of the air pipes 41 is not shown. However, a construction can be used in which the air pipes 43 extending through the casing are connected in parallel or in series and a blowing fan is connected to the air pipes, thereby forcibly blowing air through the air pipes to cool the air.

A number of disk-like fins (unnumbered) are fixed on the outer surface of the air pipes 4 so that a large contact area can be obtained between the air pipes and the gas.

The wax outlet opening 42 is at the bottom of the casing 43. Since the wax discharge opening 42 is provided for discharging the liquefied heavy components, it is disposed at least lower than the gas outlet opening 39 for exhausting the gas. The wax discharge opening 42 is connected through a pipe to a wax tank 45.

The gas freed from the heavy components in the cooling and heating heat exchanger 36 is transferred to the condenser 55.

What is claimed is:

1. An apparatus for converting synthetic resin into oil, comprising:
    a heating vessel having a body portion with upper, middle and lower portions;
    a heating furnace for heating said vessel and having a top wall extending across the top of said heating furnace, said heating vessel having at least the lower portion of said body portion within said furnace and having at least the upper portion of said body portion projecting out of said furnace through said top wall into ambient atmosphere surrounding said furnace;
    a feeding means for feeding solid synthetic resin into said heating vessel, said feeding means having a feed conduit means connected to said heating vessel, an upstream and a downstream valve in said conduit means and spaced from each other along said conduit means for defining a temporary storage chamber between said valves, and control means connected to said valves for holding said downstream valve closed while opening said upstream valve to admit synthetic resin to said temporary storage chamber and then closing said upstream valve, and then holding said upstream valve closed while opening said downstream valve, thereby feeding the synthetic resin to said heating vessel without opening said heating vessel to the atmosphere; and
    a stirring means in said heating vessel having a rotating shaft extending down into said vessel, a blade means on the lower end of said shaft, and a driving motor connected to said shaft for rotating said shaft to rotate said blade means in said vessel, said blade means being a blade extending radially of said shaft and having a lower edge conforming in shape to the shape of an inner surface of the lower portion of said body portion of said vessel and positioned sufficiently close to said inner surface for scraping any material which may accumulate on said inner surface during operation of said apparatus from said inner surface.

2. An apparatus as claimed in claim 1 in which the lower and middle portions of said body portion of said vessel are within said furnace, and the upper portion of said body portion of said vessel projects out of said furnace into ambient atmosphere surrounding said furnace, said apparatus further comprising an insulating means surrounding the middle portion of said body portion of said vessel within said furnace for insulating the middle portion of said body portion of said vessel from the interior of said furnace.

3. An apparatus as claimed in claim 2 in which the ends of said blade extend upwardly to at least the level of the lower edge of said insulating means.

4. An apparatus as claimed in claim 1 in which only the lower portion of said body portion of said vessel is within said furnace and the middle and upper portion of said body portion of said vessel project out of said furnace into ambient atmosphere surrounding said furnace.

5. An apparatus as claimed in claim 4 in which the ends of said blade extend upwardly at least to the level where said body portion of said vessel is outside said furnace.

6. An apparatus as claimed in claim 4 further comprising an insulating means surrounding the middle portion of said body portion of said vessel.

7. An apparatus as claimed in claim 1 further comprising a heat radiating flange around the top of said vessel extending radially outwardly therefrom, and a lid detachably secured to said flange.

8. An apparatus as claimed in claim 1 further comprising a heat absorbing fin on the outside of the bottom portion of said body portion of said vessel extending into the interior of said furnace.

9. An apparatus for converting synthetic resin into oil, comprising:
    a heating vessel having a body portion with upper, middle and lower portions;
    a heating furnace for heating said vessel and having a top wall extending across the top of said heating furnace, said heating vessel being within said furnace with said upper portion of said body portion opening out of the top wall of said furnace into ambient atmosphere surrounding said furnace, said heating vessel having a detachable lid coplanar with said top wall, and an insulating means surrounding the upper and middle portions of said body portion of said vessel within said furnace;
    a feeding means for feeding solid synthetic resin into said heating vessel, said feeding means having a feed conduit means connected to said heating vessel, an upstream and a downstream valve in said conduit means and spaced from each other along said conduit means for defining a temporary storage chamber between said valves, and control means connected to said valves for holding said downstream valve closed while opening said upstream valve to admit synthetic resin to said temporary storage chamber and then closing said upstream valve, and then holding said upstream valve closed while opening said downstream valve, thereby feeding the synthetic resin to said heating vessel without opening said heating vessel to the atmosphere; and a stirring means in said heating vessel having a rotating shaft extending down into said vessel, a blade means on the lower end of said shaft, and a driving motor connected to said shaft for rotating said shaft to rotate said blade means in said vessel, said blade means being a blade extending radially of said shaft and having a lower edge conforming in shape to the shape of an inner surface of the lower portion of said body portion of said vessel and positioned sufficiently close to said inner surface for scraping any material which may accumulate on said inner surface during operation of said apparatus from said inner surface.

10. An apparatus as claimed in claim 9 in which the ends of said blade extend upwardly to at least the level of the lower edge of said insulating means.

11. An apparatus as claimed in claim 9 further comprising a heat radiating flange around the top of said vessel extending radially outwardly therefrom, and said lid being lid detachably secured to said flange.

12. An apparatus as claimed in claim 9 further comprising a heat absorbing fin on the outside of the bottom portion of said body portion of said vessel extending into the interior of said furnace.

13. An apparatus for converting synthetic resin into oil, comprising:

a heating vessel having a body portion with upper, middle and lower portions;

a heating furnace for heating said vessel and having a top wall extending across the top of said heating furnace, said heating vessel having the lower and middle portions of said body portion within said furnace and having the upper portion of said body portion projecting out of said furnace through said top wall into ambient atmosphere surrounding said furnace;

an insulating means around and against the middle portion of said body portion of said vessel within said furnace for insulating the middle portion of said body portion of said vessel from the interior of said furnace; a feeding means for feeding solid synthetic resin into said heating vessel, said feeding means having a conduit means connected to said heating vessel, an upstream and a downstream valve in said conduit means and spaced from each other along said conduit means for defining a temporary storage chamber between said valves, and control means connected to said valves for holding said downstream valve closed while opening said upstream valve to admit synthetic resin to said temporary storage chamber and then closing said upstream valve, and then holding said upstream valve closed while opening said downstream valve, thereby feeding the synthetic resin to said heating vessel without opening said heating vessel to the atmosphere; and a stirring means in said heating vessel having a rotating shaft extending down into said vessel, a blade means on the lower end of said shaft, and a driving motor connected to said shaft for rotating said shaft to rotate said blade means in said vessel, said blade means being a blade extending radially of said shaft and having a lower edge conforming in shape to the shape of an inner surface of the lower portion of said body portion of said vessel and positioned sufficiently close to said inner surface for scraping any material which may accumulate on said inner surface during operation of said apparatus from said inner surface.

14. An apparatus for converting synthetic resin into oil, comprising:

a heating vessel having a body portion with upper, middle and lower portions;

a heating furnace for heating said vessel and having a top wall extending across the top of said heating furnace, said heating vessel having the lower and middle portions of said body portion within said furnace and having the middle and upper portion of said body portion projecting out of said furnace through said top wall into ambient atmosphere surrounding said furnace;

an insulating means around and against the middle portion of said body portion of said vessel; a feeding means for feeding solid synthetic resin into said heating vessel, said feeding means having a conduit means connected to said heating vessel, an upstream and a downstream valve in said conduit means and spaced from each other along said conduit means for defining a temporary storage chamber between said valves, and control means connected to said valves for holding said downstream valve closed while opening said upstream valve to admit synthetic resin to said temporary storage chamber and then closing said upstream valve, and then holding said upstream valve closed while opening said downstream valve, thereby feeding the synthetic resin to said heating vessel without opening said heating vessel to the atmosphere; and a stirring means in said heating vessel having a rotating shaft extending down into said vessel, a blade means on the lower end of said shaft, and a driving motor connected to said shaft for rotating said shaft to rotate said blade means in said vessel, said blade means being a blade extending radially of said shaft and having a lower edge conforming in shape to the shape of an inner surface of the lower portion of said body portion of said vessel and positioned sufficiently close to said inner surface for scraping any material which may accumulate on said inner surface during operation of said apparatus from said inner surface.

15. An apparatus for converting synthetic resin into oil, comprising:

a heating vessel having a body portion with upper, middle and lower portions;

a heating furnace for heating said vessel and having a top wall extending across the top of said heating furnace, said heating vessel being within said furnace with said upper portion of said body portion opening out of the top wall of said furnace into ambient atmosphere surrounding said furnace, said heating vessel having a detachable lid coplanar with said top wall; a feeding means for feeding solid synthetic resin into said heating vessel, said feeding means having a conduit means connected to said heating vessel, an upstream and a downstream valve in said conduit means and spaced from each other along said conduit means for defining a temporary storage chamber between said valves, and control means connected to said valves for holding said downstream valve closed while opening said upstream valve to admit synthetic resin to said temporary storage chamber and then closing said upstream valve, and then holding said upstream valve closed while opening said downstream valve, thereby feeding the synthetic resin to said heating vessel without opening said heating vessel to the atmosphere; and a heating vessel having a body portion with upper, middle and lower portions;

an insulating means around and against the upper and middle portion of said body portion of said vessel within said furnace for insulating the upper and middle portions of said body portion of said vessel from the interior of said furnace; and a stirring means in said heating vessel having a rotating shaft extending down into said vessel, a blade means on the lower end of said shaft, and a driving motor connected to said shaft for rotating said shaft to rotate said blade means in said vessel, said blade means being a blade extending radially of said shaft and having a lower edge conforming in shape to the shape of an inner surface of the lower portion of said body portion of said vessel and positioned sufficiently close to said inner surface for scraping any material which may accumulate on said inner surface during operation of said apparatus from said inner surface.

* * * * *